Jan. 16, 1940.                W. O. BECHMAN                 2,187,411
                          DRAWBAR CONSTRUCTION
                           Filed Oct. 15, 1938
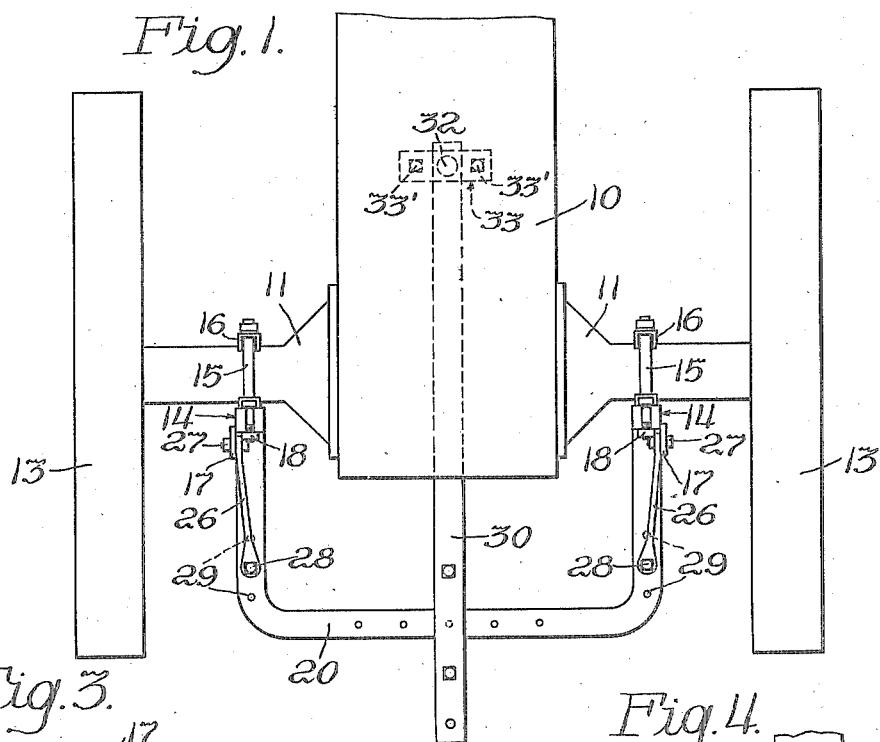
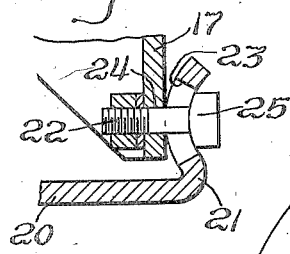
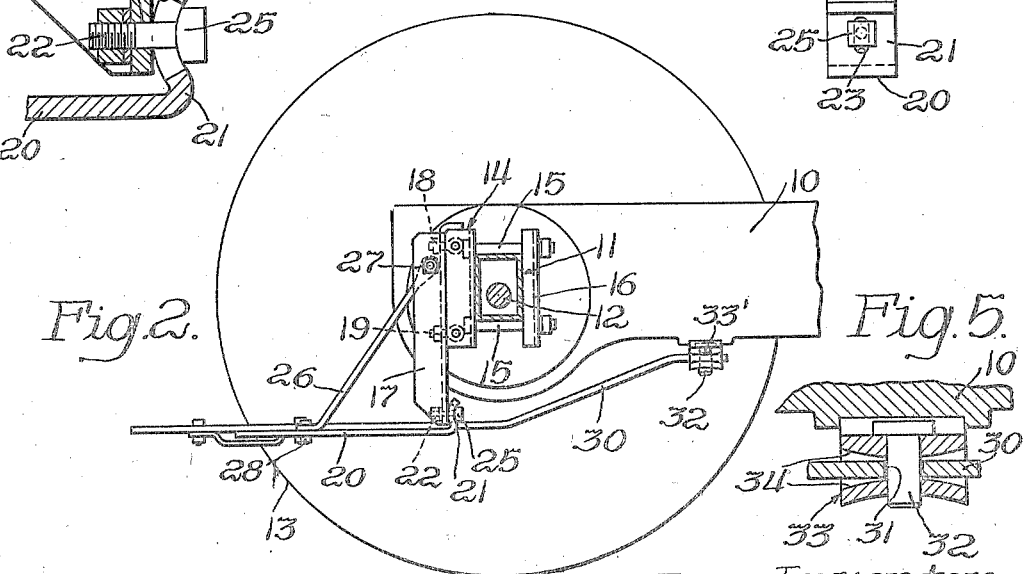
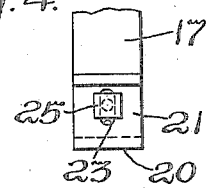
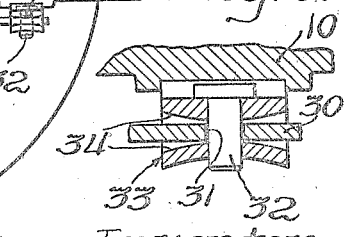
Inventor
William O. Bechman
By [signature]
Atty.

Patented Jan. 16, 1940

2,187,411

UNITED STATES PATENT OFFICE 2,187,411

DRAWBAR CONSTRUCTION

William O. Bechman, Chicago, Ill., assignor to International Harvester Company, a corporation of New Jersey Application October 15, 1938, Serial No. 235,143

5 Claims. (Cl. 280—33.44)

This invention relates to a drawbar construction for tractors. More specifically it relates to improvements in a drawbar constructed for vertical adjustment.

In farm tractors, it is sometimes desirable to adjust the drawbar to different vertical heights for different conditions or for operating different implements. It has been common practice to provide drawbars swingable on a transverse axis and supported by adjustable braces, whereby the rear portion of the drawbar could be adjusted to different vertical heights.

The principal object of the present invention is to improve the prior art constructions, to provide a better bearing surface for the pivot axis, and to remove the draft from bolts or other similar pivot means.

Another object is to provide an extension drawbar connected under the frame of the tractor and cooperating with the adjustable U-shaped drawbar connected at the rear of the frame structure.

The above objects are attained by a construction as illustrated in the drawing.

Figure 1 is a plan view of the rear portion of a tractor showing a drawbar construction incorporating the features of the invention;

Figure 2 is a side elevation of the drawbar construction with one axle housing broken away in section to remove the wheel whereby the drawbar construction can be better seen;

Figure 3 is an enlarged sectional view showing the adjustable connection between the drawbar and the members to which it is attached;

Figure 4 is an elevation from the rear of the pivot connection shown in Figure 3; and, Figure 5 is a sectional view on an enlarged scale of the connection of the longitudinal draft member with the tractor frame.

In the drawing, the rear portion of a tractor frame 10 is shown, to which transversely extending rear axle housings 11 are connected. Said housings contain axle shafts 12 on which drive wheels 13 are mounted. As shown, the rear axle housings 11 are rectangular in cross-section throughout the measured portion of their length. This construction provides for securing quick attachable brackets 14 at various points along the axle structure. Said brackets are rigidly secured in position by bolts 15 above and below the axle housings and channels 16 at the forward sides of the axle housings. It will be understood that the construction at each side of the tractor is exactly the same.

Vertical angle bars 17 are secured to the brackets 14 by eye-bolts 18 and 19. These eye-bolts form a part of the quick attaching means. This construction is not shown in detail and will not be described, as it is not a part of this invention and is disclosed and claimed in U. S. Patent No. 2,092,584 to C. W. Mott, September 7, 1937. The angle bars 17 extend a substantial distance below the axle housings 11. Said bars have one of their faces lying in a vertical transverse plane and the other face projecting rearwardly at right angles therefrom and lying in vertical longitudinal planes. A U-shaped drawbar 20 of a conventional construction having a transverse rear portion and two forwardly extending side portions is provided with up-turned ends 21 at the forward end of the side portions. Said ends are bent with an arcuate face engageable with the rear side of the vertical transverse portion of the members 17. It will be noted that the side portions of the drawbar 20 are spaced somewhat below the end of the member 17 whereby said drawbar may be rocked about a transverse axis with the arcuate faces on the extensions 21 rocking on the rear of said members. Bolts 22 extend through arcuate slots 23 in the extensions 21 and through openings 24 in the lower ends of the members 17. Said bolts are preferably formed with heads 25 having an arcuate formation where the heads engage the arcuate extensions 21. By means of this construction, the drawbar may be rocked without loosening the bolts 22 even though the bolts may be securely tightened in position. By means of this construction, the entire draft at these points is taken by contact of the arcuate extensions 21 against the members 17. There is very little strain on the bolts and no wear tending to cut the bolt or weaken the joint.

The drawbar 20 is held in position by angularly disposed braces 26, secured at their upper ends by bolts 27 to the side portions of the members 17. At their lower ends, the braces 26 are adjustably secured to the drawbar 20 by bolts 28. Said bolts may be inserted through any one of a plurality of openings 29 in the drawbar 20 whereby the drawbar may be fixed in a number of different vertically adjusted positions.

For some type of work, it is desirable to have a draft member 30 secured forwardly under the tractor. Said draft member is shown as being provided at its forward end with a large opening 31 through which a large diameter pin 32 extends to transmit draft to the tractor. Said pin extends through alined openings formed in a securing member 33, which is fitted in a recess formed in the tractor housing 10 and secured thereto by transversely spaced bolts 33'. The securing member 33 is provided with a longitudinal opening through which the draft member 30 extends. The upper and lower portions of the member forming the openings are formed as arcuate faces 34 to provide for limited vertical swinging of the rear end of the draft member 30. This construction provides the necessary movement for vertical swinging of the drawbar 20 to its different positions of adjustment.

The advantages gained by the construction have been pointed out in connection with the description. The principal feature of novelty is the pivot connection between the U-shaped drawbar 20 and the vertical members 17. By means of the construction as shown, there is no wear or strain on the connecting bolts 22 and a very strong, long lasting connection is obtained.

It is to be understood that applicant has shown only a preferred embodiment of his improved drawbar construction and that he claims as his invention all modifications falling within the scope of the appended claims.

What is claimed is:

1. In a tractor having a frame structure, and, in combination therewith, vertical members connected to the frame structure and extending downwardly therefrom, a drawbar having connections with said members, said connections consisting of upwardly bent slotted end portions having arcuate curved faces lying in contact with rear portions of the lower ends of the vertical members and bolts extending through said slotted arcuate end portions and through the lower end portions of the vertical members.

2. In a tractor having a frame structure, and, in combination therewith, vertical members connected to the frame structure and extending downwardly therefrom, a drawbar having connections with said members, said connections consisting of upwardly bent slotted end portions having arcuate curved faces lying in contact with rear portions of the lower ends of the vertical members and bolts extending through said slotted arcuate end portions and through the lower end portions of the vertical members, said bolts having heads with arcuate inner portions contacting the arcuate portions of the drawbar, whereby said drawbar may be moved vertically for adjustment with the bolts remaining in securing position.

3. In a tractor having a transverse rear axle structure, the combination of transversely spaced vertical supporting members connected to the axle structure and extending downwardly therefrom, a U-shaped drawbar having connections with said members, said connections consisting of upwardly bent slotted end portions having arcuate curved faces lying in contact with rear portions of the lower ends of the vertical members and bolts extending through said arcuate end portions and through the lower end portions of the vertical members.

4. In a tractor having a frame structure and a transverse rear axle structure, the combination of transversely spaced vertical supporting members connected to the axle structure and extending downwardly therefrom, a U-shaped drawbar having connections with said members, said connections consisting of upwardly bent end portions having arcuate curved faces in contact with rear portions of the lower ends of the vertical members, bolts extending through said arcuate end portions and through the lower end portions of the vertical members, and a draft member connected to the frame structure forwardly of the axle structure and supported on the drawbar.

5. In a tractor having a frame structure, vertical supporting members connected to the rear of the frame structure and extending downwardly therefrom, a U-shaped drawbar having connections with said members, said connections consisting of slotted upwardly bent end portions having arcuate curved faces lying in contact with rear portions of the lower ends of the vertical members, bolts extending through said arcuate end portions and through the lower end portions of the vertical members, said bolts having heads with arcuate inner portions contacting the arcuate portions of the drawbar, whereby said drawbar may be moved vertically for adjustment with the bolts remaining in tightened securing position, and braces connected at one end to the vertical members and at their other ends to the drawbar.

WILLIAM O. BECHMAN.